United States Patent
Mahalingaiah

[19]

[11] Patent Number: 6,134,670
[45] Date of Patent: Oct. 17, 2000

[54] METHOD AND APPARATUS FOR GENERATION AND SYNCHRONIZATION OF DISTRIBUTED PULSE CLOCKED MECHANISM DIGITAL DESIGNS

[76] Inventor: Rupaka Mahalingaiah, 6503 Farmdale La., Austin, Tex. 78749

[21] Appl. No.: 09/017,418

[22] Filed: Feb. 2, 1998

[51] Int. Cl.[7] ........................................ G06F 1/12
[52] U.S. Cl. ........................................ 713/401
[58] Field of Search ........................... 713/400, 601, 713/401

[56] References Cited

U.S. PATENT DOCUMENTS

| | | | |
|---|---|---|---|
| 4,890,222 | 12/1989 | Kirk | 713/400 |
| 5,481,573 | 1/1996 | Jacobowitz et al. | 713/400 X |
| 5,712,882 | 1/1998 | Miller | 714/700 X |
| 5,712,883 | 1/1998 | Miller et al. | 714/700 X |
| 5,987,620 | 11/1999 | Tran . | |

*Primary Examiner*—Thomas M. Heckler

[57] ABSTRACT

A distributed clocking mechanism is provided for synchronous digital designs. Each functional unit in the design is associated with a distributed clock unit that generates controlled local clocks. The clock period and the pulse width of local clock can be varied. Multiple clocks with varying phases are generated. The local clocks are synchronized with other local clocks and also with external clock. This controlled, distributed clocking mechanism provides flexibility to the design, increases performance, and reduces power consumption and noise of the device in comparison to traditional synchronous central clocking mechanism. This mechanism also enables the design to operate with multiple external clocks allowing for easy integration of multiple functionality to the design.

25 Claims, 11 Drawing Sheets

A Unit with Distributed Clock

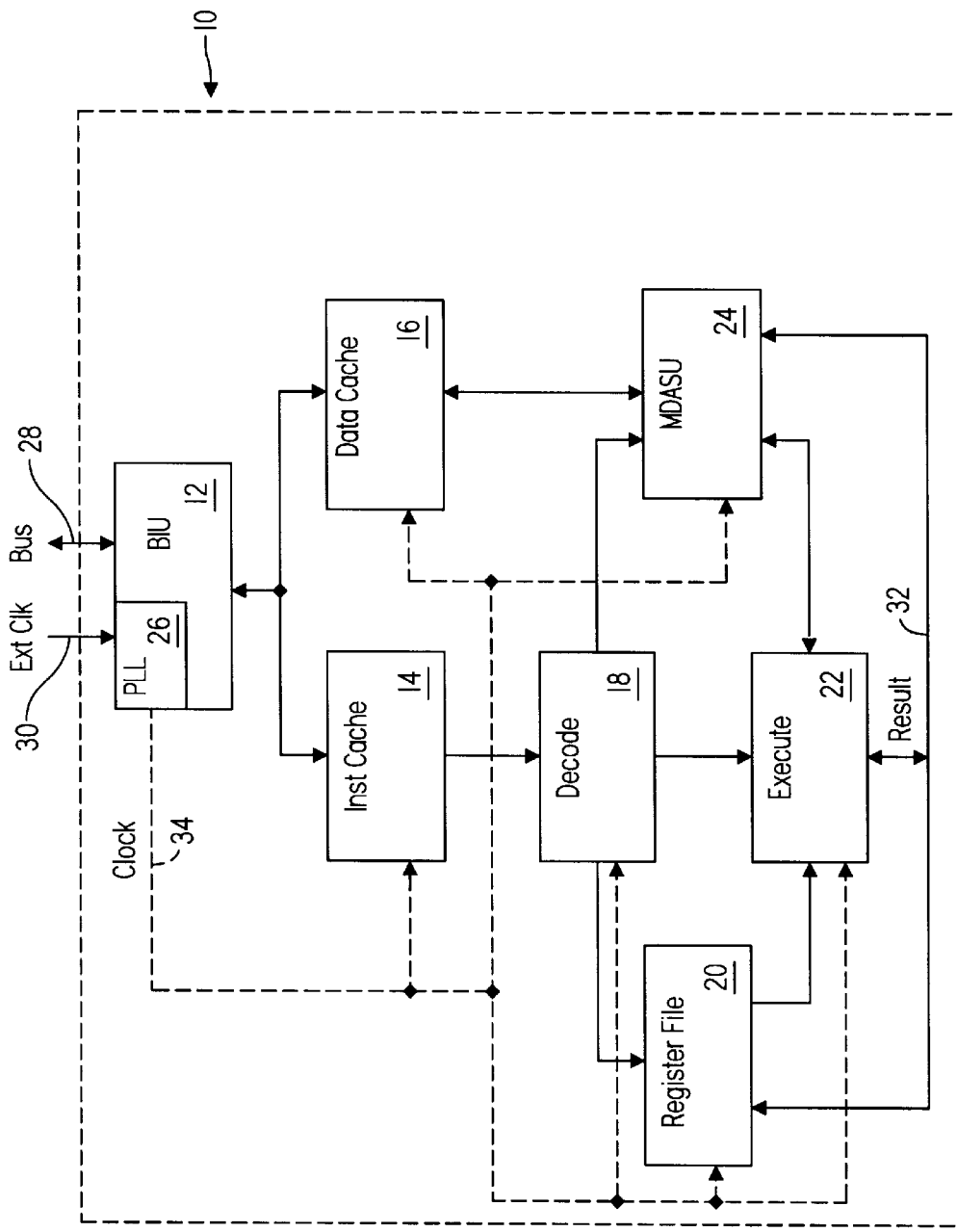
FIG. 1 - Prior Art: A Simple Processor with Central Clocking Scheme

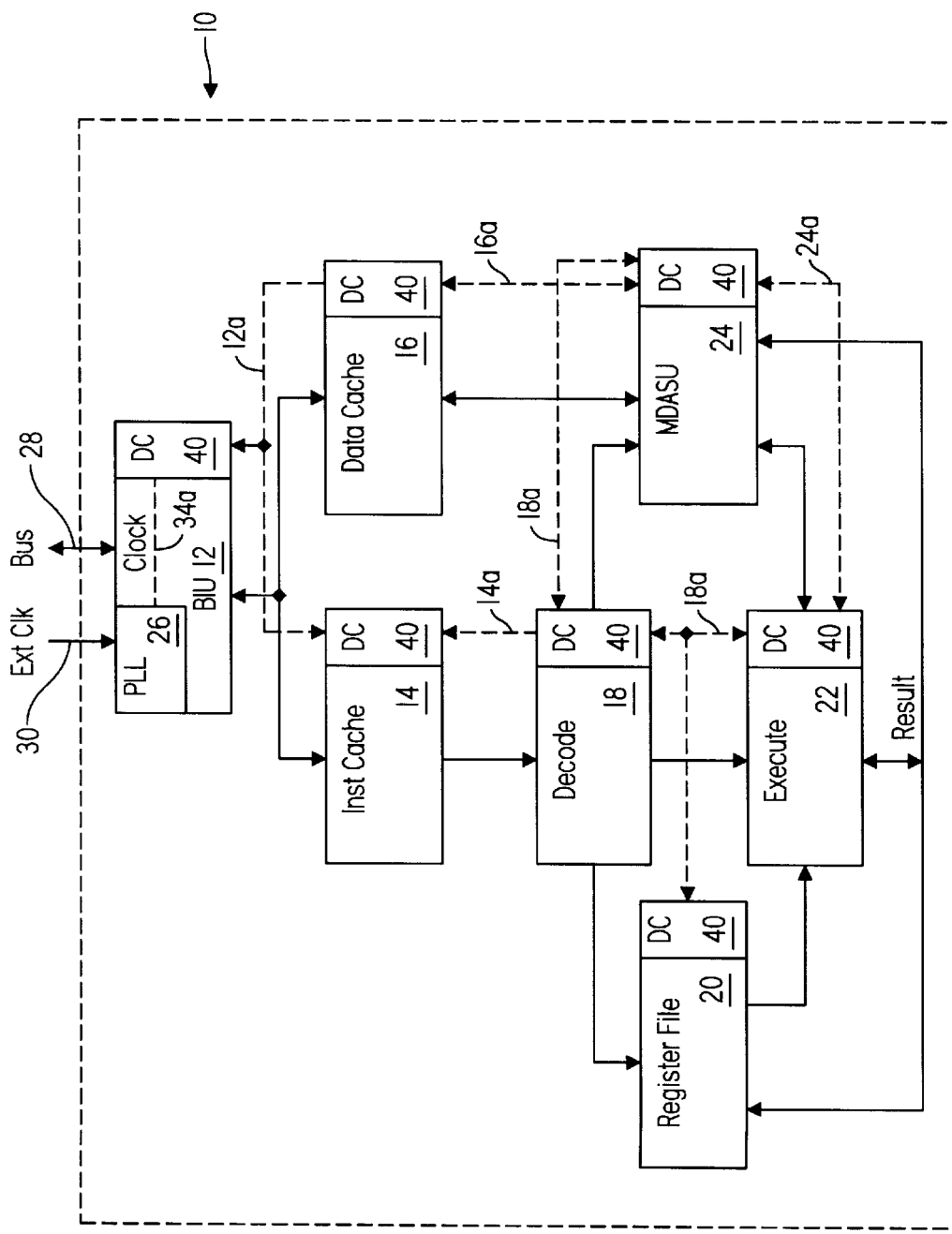
FIG. 2 - A Simple Processor with Distributed Clocking Scheme

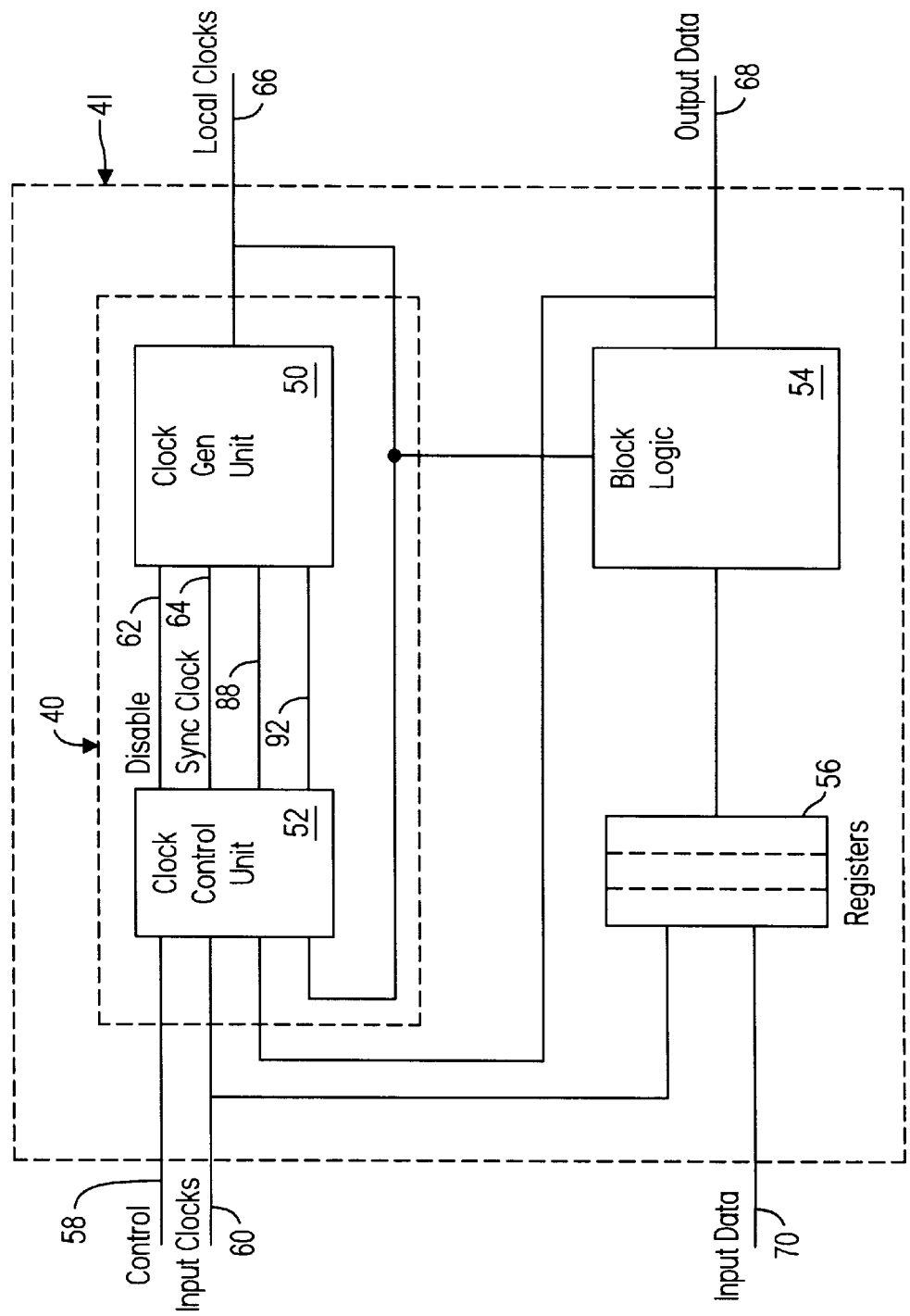
FIG. 3 - A Unit with Distributed Clock

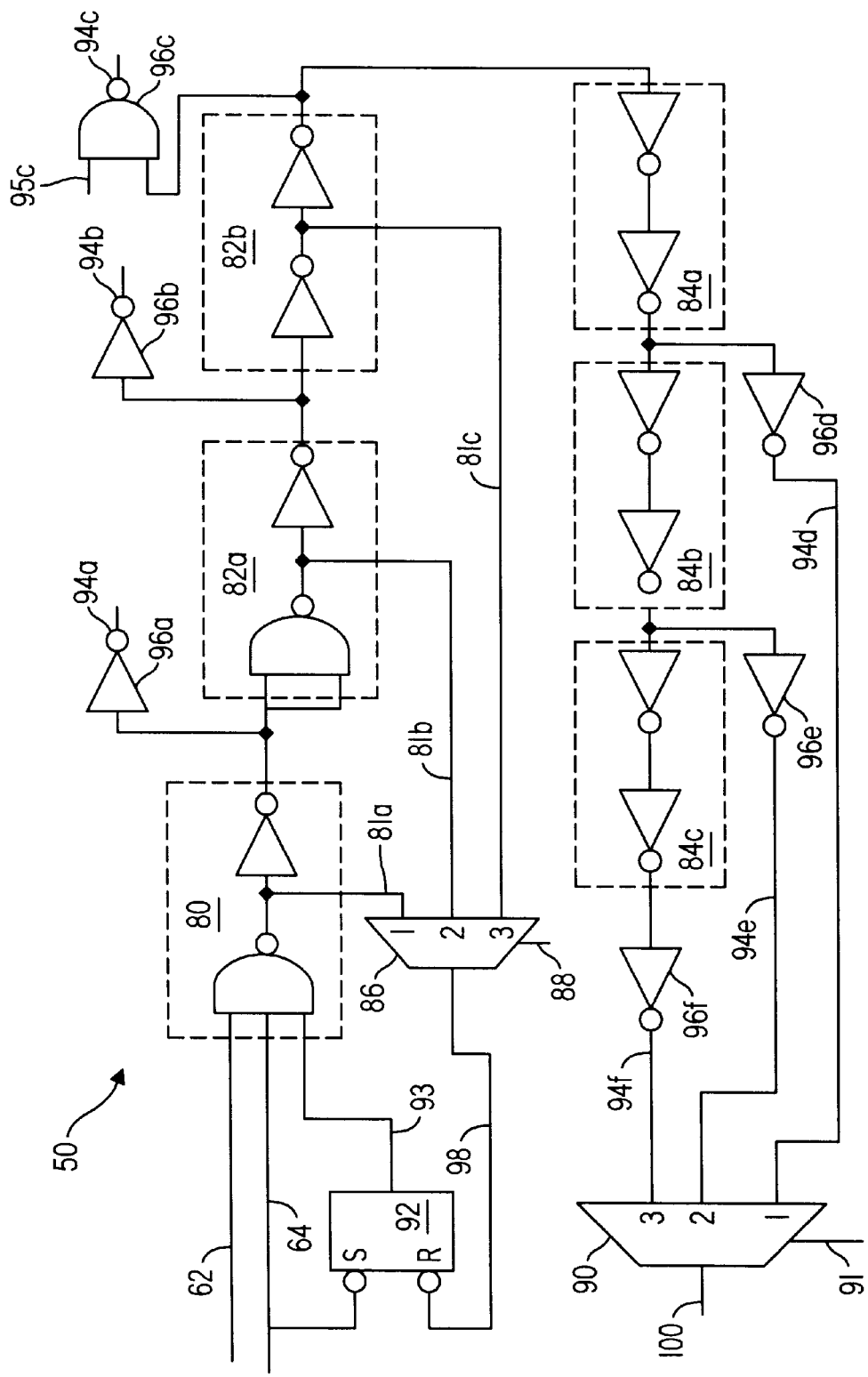
FIG. 4a - A Clock Generating Circuit

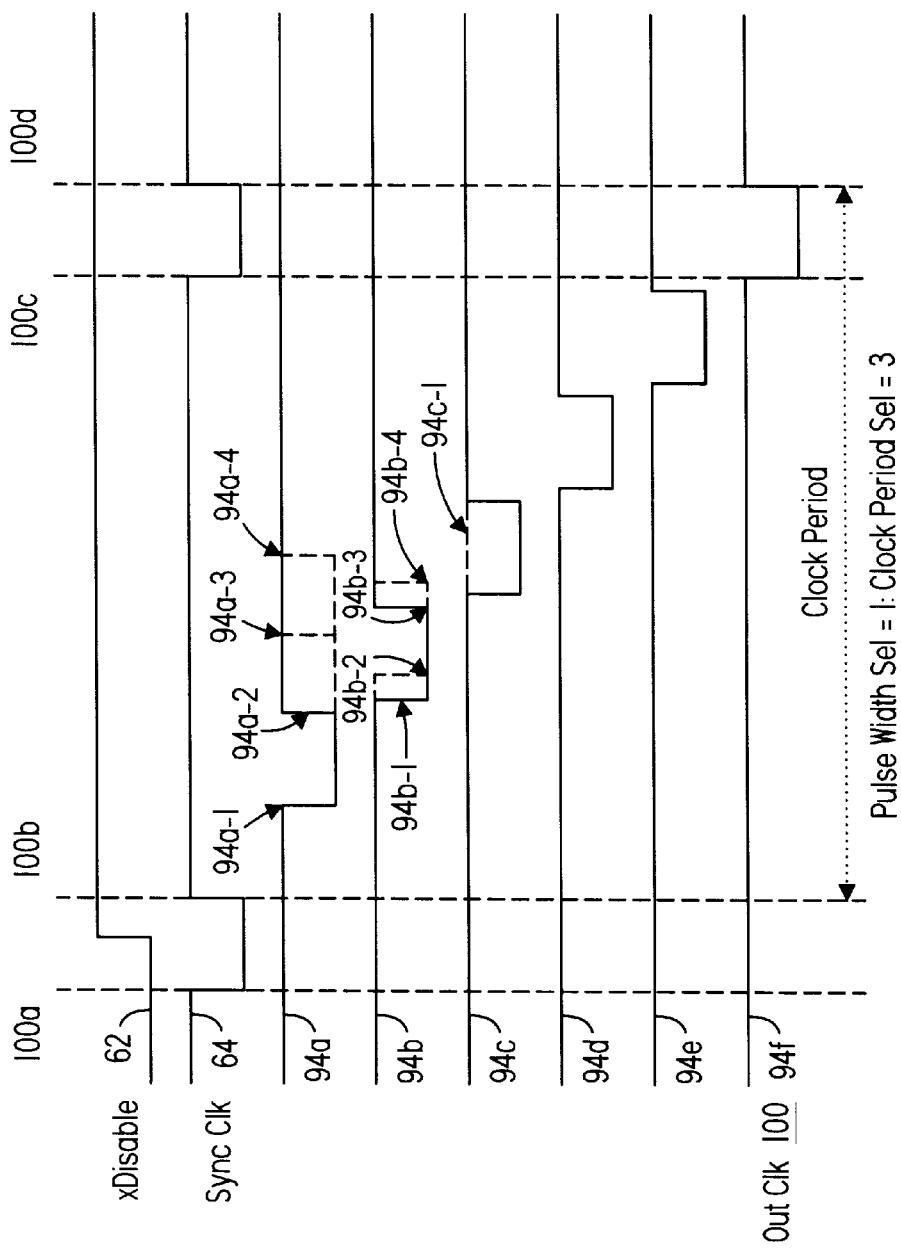
FIG. 4b - Timing Diagram for One Clock Cycle

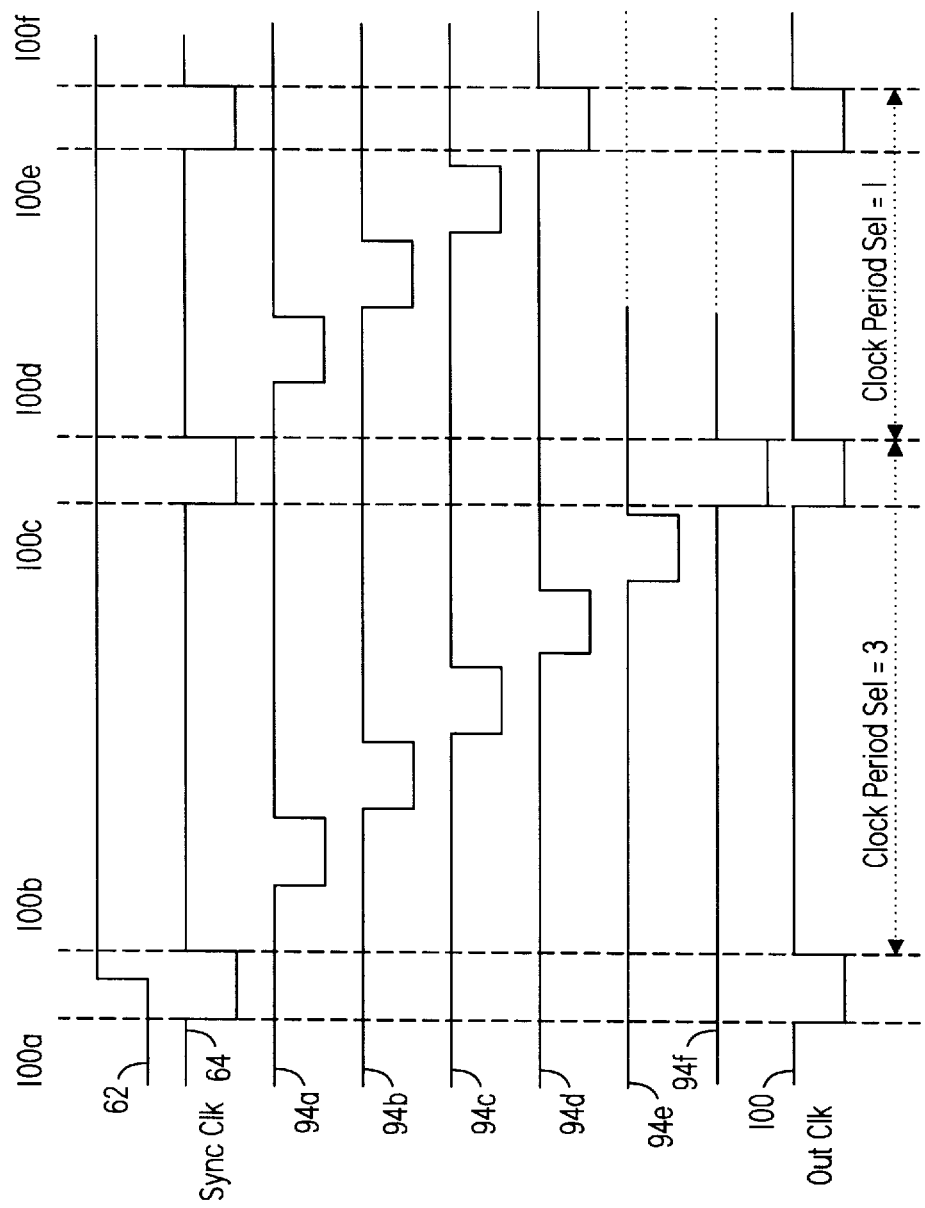
FIG. 4c – Timing Diagram for Multiple Clock Cycles with Varying Clock Period

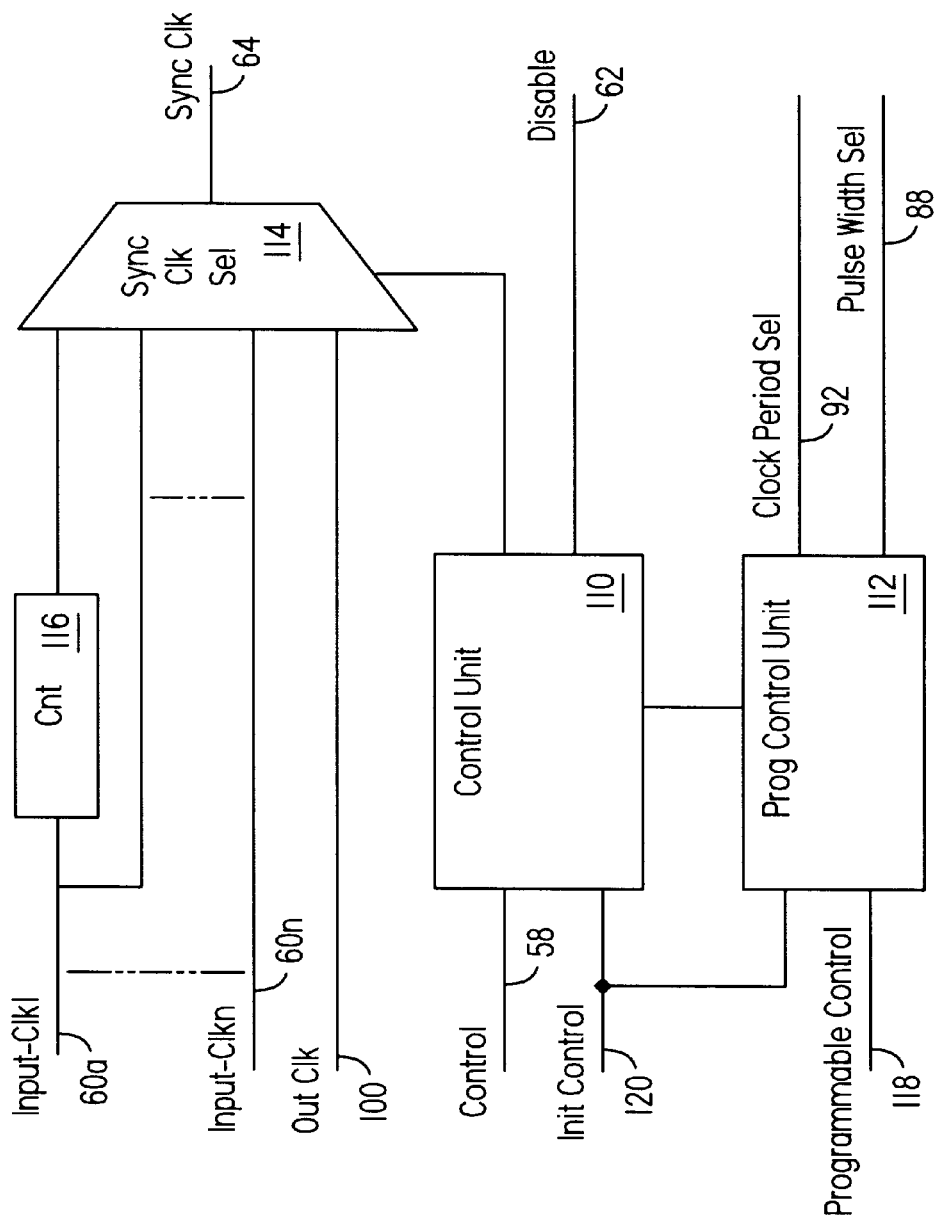
FIG. 5 - A Clock Control Unit

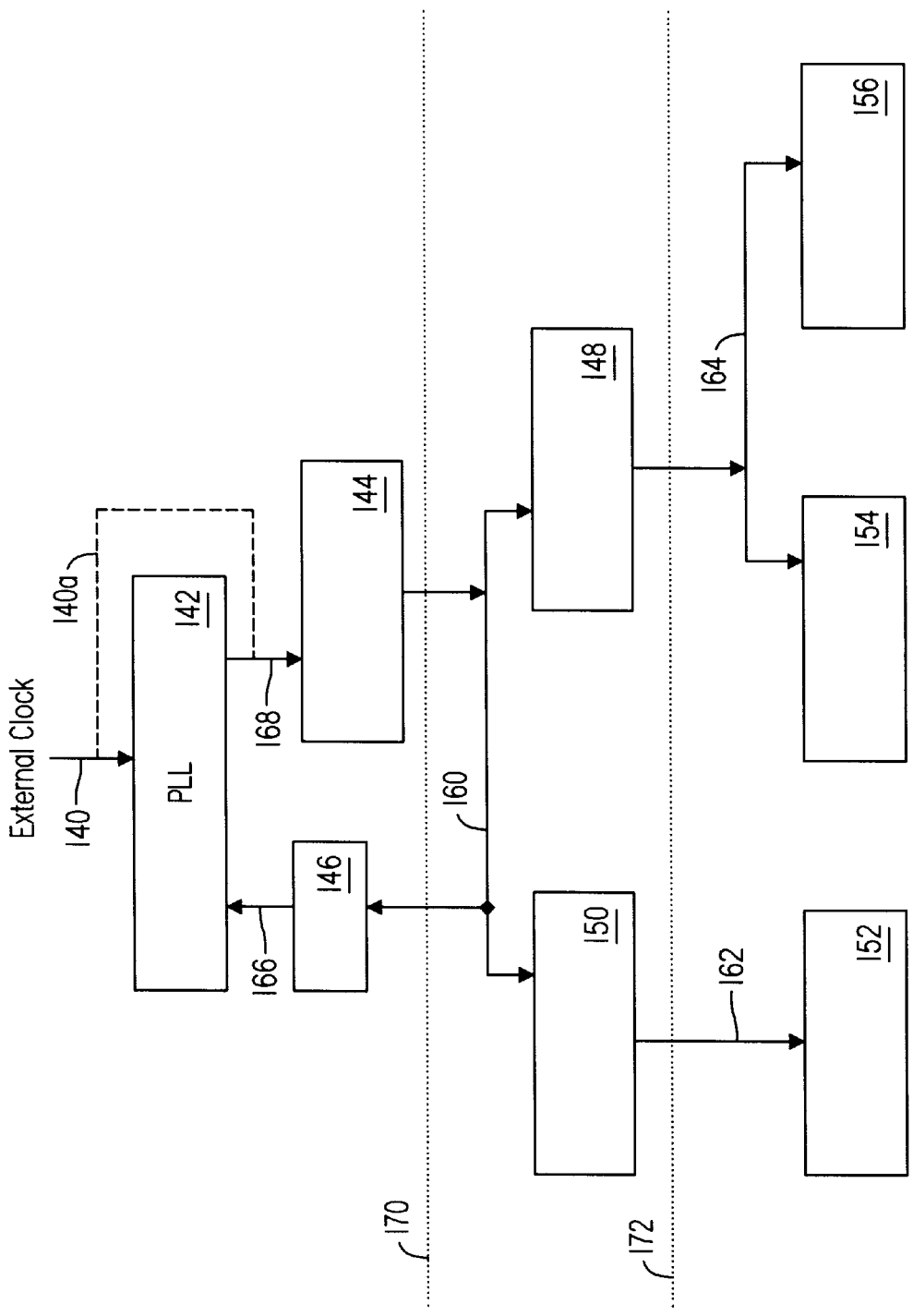
FIG. 7 - Synchronizing Local Clocks to External Clock

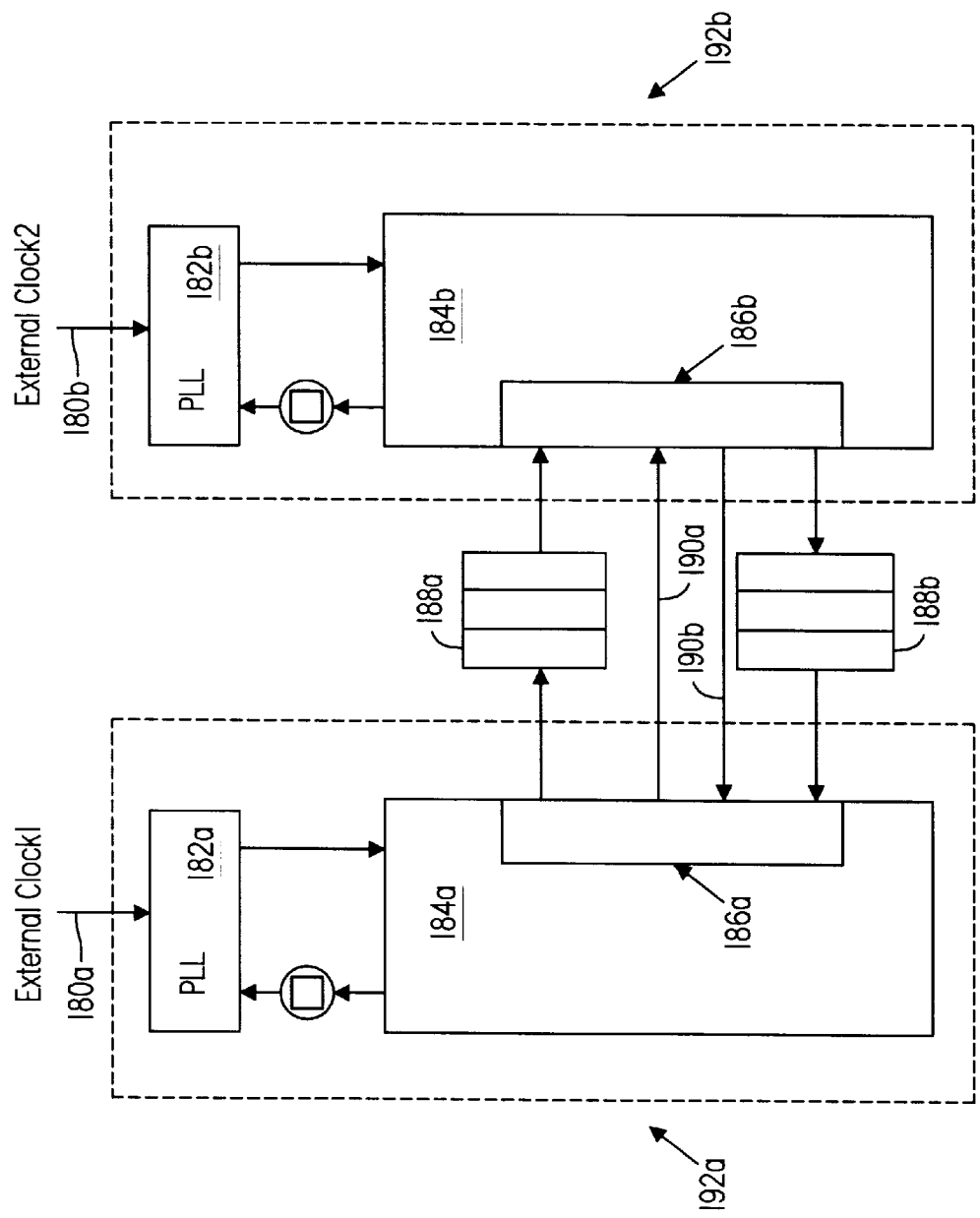
FIG. 8 - Design with Two External Clocks

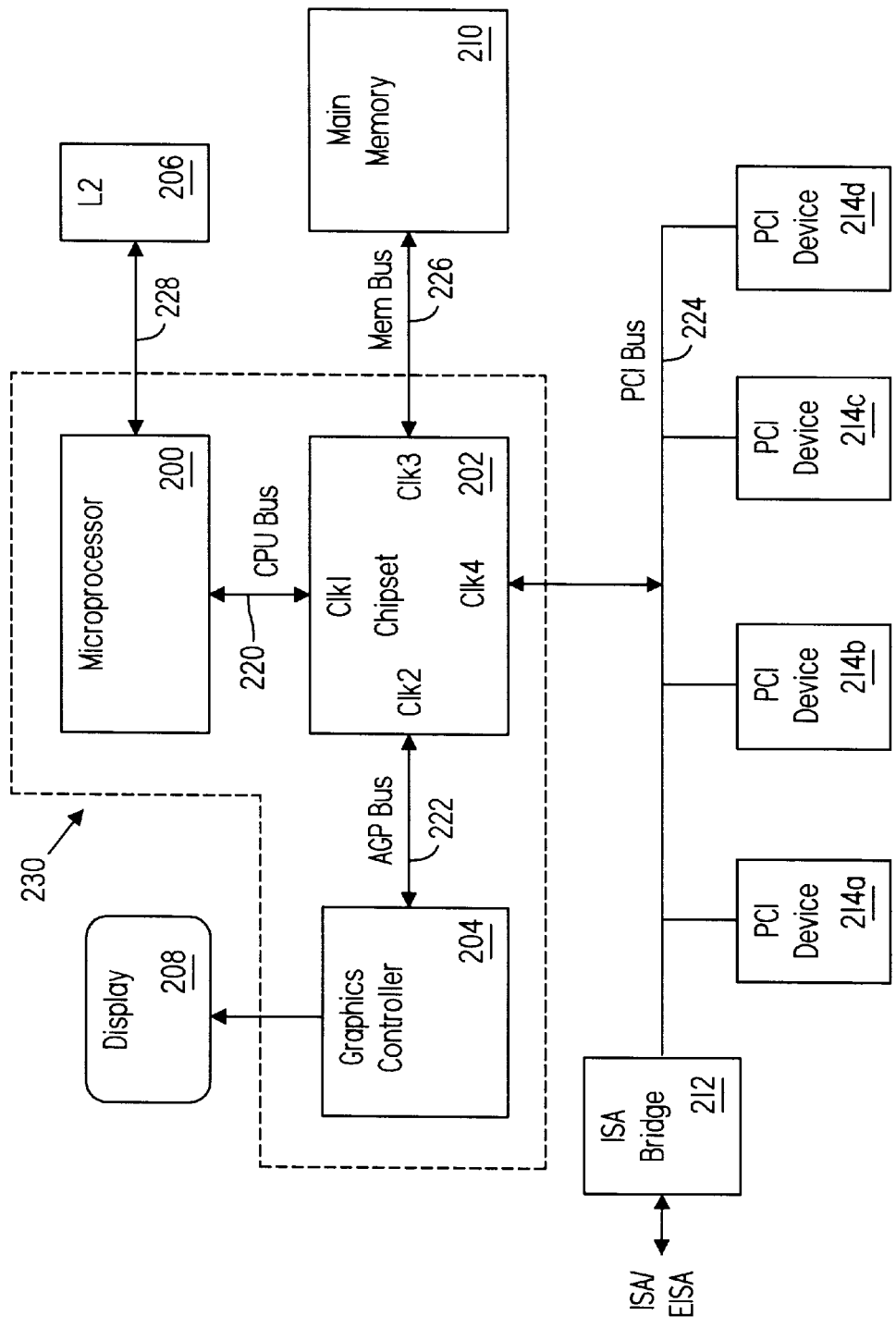
FIG. 9 – A Computer System

METHOD AND APPARATUS FOR GENERATION AND SYNCHRONIZATION OF DISTRIBUTED PULSE CLOCKED MECHANISM DIGITAL DESIGNS

BACKGROUND OF THE INVENTION

1. Field of the Invention

This invention relates to digital designs (such as microprocessors and computer systems) and, more particularly, to mechanisms and techniques to generate and utilize controlled distributed clocking mechanism in digital designs.

2. Brief Description of the Related Technology

Most digital designs of today, such as microprocessors, are based on synchronous design methodology. The term "synchronous design" generally refers to the method employed to control the timing of the design. An external clock (a signal with deterministic period of state change) generally controls the time at which the events are executed within a design in a very deterministic fashion. Either the external clock or a derivative of this clock is distributed in a disciplined manner throughout the chip. All timed elements in the design use this centralized clocking mechanism for their operation. This guarantees the time synchronization of various elements within the design. Most microprocessors of today use this methodology and there is a wealth of Computer Aided Design (CAD) tools and verification tools and methodology to support this.

To achieve higher performance, computers are running at high clock frequencies. It is projected that the clock frequency would reach the gigahertz range by the end of this century. As the frequency increases, the clock period decreases. The term "clock period" refers to the interval of time between, say, the two raising (or falling) edges of the clock signal. Generally, this is the time available to various elements of the design to perform their defined tasks. At high frequencies, this time is quite small—in the order of nanosecond. In the centralized clocking mechanism described above, certain percentage (10–15%) of this precious clock period needs to be allocated for clock skew and jitter thus reducing the useful work time. The term "clock skew" refers to the time difference between same clock edges at different part of the circuit. To reduce the effects of this, special attention is paid in the design to buffer and route clocks as high priority signals.

A clock traditionally has two transitions in a clock period. One when it transitions from say low level to high level (known as raising edge) and the other when it transitions back to low level from high level (known as falling edge). The time at which a transition occurs within a clock period defines the term "clock phase". Traditionally, designs have at most two clock phases available to them.

Most commonly, the clock signals convey only timing information. For the most part, they do not convey any functional or control information. It is becoming common for the clock tree to account for 25–35% of the total power consumption in a high performance microprocessor. The term "clock tree" refers to clock signals, their routing channels, and the buffers associated with the clock in the circuit. It also accounts for the major portion of the harmonic noise emitted by the device. Some of the designs such as microprocessors by Advanced RISC Machine (ARM) use gated clocks to various elements in the circuit to reduce the power dissipation. The term "gated clock" refers to conditionally allowing the input of a block or unit to change with the clock. This controls the operation of the unit to some extent. However, it still does not account for clock tree itself. In some cases, this could introduce delay due to gating function generation. Several other microprocessors such as Intel's Pentium series add several low power modes during inactive phase to reduce power dissipation. Special low power modes have overhead delays associated with them for entry and exit. Also, they do not help in reducing "active power" dissipation. The term "active power" refers to power dissipated when a design is in its normal mode of operation.

Asynchronous design methodology can solve most of the problems associated with the synchronous design methodology as they do not have central clock. Request-and-acknowledge handshake protocols are used to communicate between internal units. To date, most of the asynchronous microprocessors are academic in nature. This methodology introduces many problems due to non-deterministic result generation. Asynchronous design methodology introduces an entire set of new problems associated with design verification, testing, and operation (or interface) with other devices in the system. As the result generation is at the internal pace, externally it is not possible to determine when to expect it. Any glitches can result in incorrect operation of the device. For synchronous designs, results are evaluated deterministically with the clock. However, in asynchronous design, it can happen any time introducing a whole set of verification parameters.

To increase the throughput, high performance devices such as microprocessors have traditionally used the concept of "pipelining". The term "pipelining" refers to subdividing an operation into multiple serial functions. When the first operation passes through the first functional logic and enters the second functional logic, it allows the next operation to use the first functional logic. In synchronous designs, storage elements (e.g., registers) capture the value of the first operation according to a rising or a falling edge of a clock signal allowing next operation to enter the functional logic. Thus storage elements provide time isolation between logic of different functional units. The concept of pipelining allows the device to operate at much higher frequency, thus increasing the throughput and the performance. As the clock periods are shrinking, the pipeline registers have started to account for 10–15% of the clock period. Also, in a complex design, the pipeline registers can account to 10% of the total die area.

Traditionally, centralized clock provides two timing points within a period (one positive-edge—when the signal switches from logical zero to one—and another negative-edge). The duty cycle (the ratio of logic one time to logic zero time) of the clock is fixed throughout the design. Traditionally, microprocessor designs tend to use both edges (or phases) of the clock. This tends to double the clock skew and jitter problem in the centralized clocking scheme. Disadvantageously, the limit of two timing reference points in a clock cycle and fixed duty cycle restricts design alternatives.

SUMMARY OF THE INVENTION

The problems outlined above are in large part solved by a design in accordance with the present invention. The present invention is adaptable for use in any digital design. In particular, the invention provides a local, self generated, distributed, multi pulse based clocking scheme that can incorporate control and functional information with it. This clock is referred to herein as a local-clock. Problems associated with the centralized clocking scheme such as clock skew, clock jitter and higher power dissipation are solved by generating controlled multiple clocks distributed throughout the design. These local-clocks are further synchronized with external clock/clocks and with each other by special mechanisms in accordance with this invention. The invention enables the distributed clocking mechanism to perform in a deterministic fashion.

The local-clocks are generated individually within a unit (element, block or stage) of the design. This permits the clocks to be enabled conditionally when required. Conditional enabling of the local-clocks reduces the power consumption and the harmonic noise to that of asynchronous design levels. Thus this invention provides means to combine the advantages of synchronous and asynchronous design philosophies.

Advantageously, local-clocks generate clock pulses with deterministic period and pulse width. Also, pluralities of clocks are generated at different clock phase. Controlled multiple pulse clocking scheme according to this invention provides a design with plurality of timing reference points within a clock cycle.

Further, the present invention contemplates a design capable of running on multiple external clocks. The invention further contemplates on mechanisms to synchronize internal clocks of differing clock periods.

A further understanding of the nature and advantages of the present invention may be realized by reference to the remaining portions of the specification and the drawings.

BRIEF DESCRIPTION OF THE DRAWINGS

So that the manner in which the above recited advantages and features of the present invention, as well as others which will become apparent, are attained and can be understood in detail, a more particular description of the invention summarized above may be had by reference to the embodiment thereof which is illustrated in the appended drawings, which drawings form a part of this specification.

It is to be noted, however, that the appended drawings illustrate only typical embodiments of the invention and therefore not to be considered limiting of its scope, for the invention may admit to other equally effective embodiments.

FIG. 1 is a block diagram of one embodiment of a simple processor with central clocking scheme (prior art).

FIG. 2 is a block diagram of one embodiment of a simple processor with distributed clocking mechanism.

FIG. 3 is a block diagram of one embodiment of a unit of FIG. 2 configured in accordance with the present invention.

FIG. 4a is a circuit diagram for an embodiment of distributed, multi pulse, self-generating clocking scheme.

FIG. 4b depicts a timing diagram for one cycle for the circuit of FIG. 4a.

FIG. 4c is another timing diagram depicting multiple clock cycle generation with varying clock period using circuit shown in FIG. 4a.

FIG. 5 is a block diagram for an embodiment of clock control unit to control the operation of clock generation unit.

FIG. 7 is a block diagram depicting synchronization of external clock to local clocks.

FIG. 8 is a block diagram of one embodiment for synchronizing plurality of external clocks in accordance with this invention.

FIG. 9 is a block diagram of one embodiment of a computer system.

Figure 6:
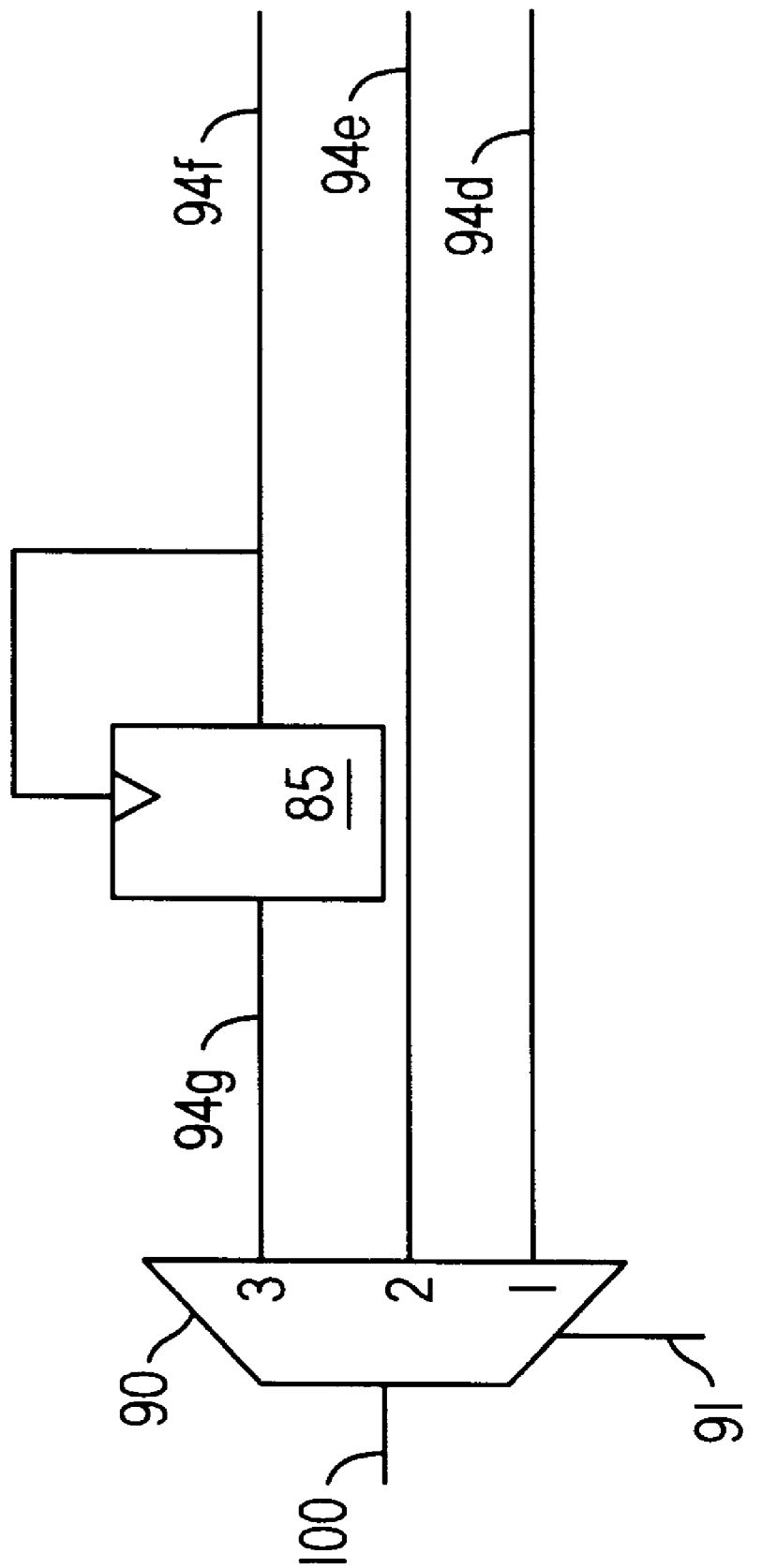
FIG. 6 depicts a circuit diagram of clock period selection logic of FIG. 4a with capability to run at lower frequencies.

While the invention is susceptible to various modifications and alternative forms, specific embodiments thereof are shown by way of example in the drawing and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Referring now to FIG. 1, a block diagram of an embodiment of a processor 10 is shown. A simple embodiment is shown to assist in the description of the present invention. The invention applies equally well to all embodiments synchronous digital designs. It should be noted that the present invention applies well to all modern, complex, processors(including microprocessors) as well as computer systems.

As shown in FIG. 1, microprocessor 10 comprise of multiple digital functional units such as, a Bus Interface Unit (BIU) 12, an instruction cache 14, a data cache 16, a decode unit 18, a register file 20, an execution unit 22, and a Memory Data Access Control Unit (MDACU) 24. The microprocessor 10 interfaces with the external world through a Bus 28.

The external clock 30 governs the functioning of microprocessor 10 in time domain. An internal Phase Locked Loop (PLL) 26 generates an internal clock 34 for microprocessor 10 in synchronization with external clock 30.

Instruction cache 14 and data cache 16 are coupled to receive instructions and data respectively from the main memory subsystem (not shown) through the BIU 12. Decode unit 18 is coupled to receive instruction data from instruction cache 14. Decode unit 18 is further coupled with register file 20, execution unit 22 and MDACU 24 to provide instruction control information to these units. Further, register file 20 is coupled with execution unit 22 in providing data for execution. Similarly, MDACU 24 is coupled with execution unit 22 in providing access to memory data. Also, the MDACU 24 is coupled with data cache 16.

Generally speaking, instructions are fetched from main memory and stored into instruction cache 14 through BIU 12. During execution, instructions are fetched from the instruction cache 14 and decoded by the decode unit 18 which drives the execution unit 22 to execute the decoded instruction/instructions. Execution unit 22 gets the operand data for execution from either register file 20 and/or data cache 16 through MDACU 24. Results generated from execution unit 22 are written back to register file 20 and/or data cache 16 through MDACU 24.

Traditionally, each of these units described above constitutes one or more pipeline stages in a microprocessor. If an instruction (e.g., I1) is fetched from instruction cache 14 during a clock (say C1), during the next clock cycle (say C2), instruction I1 will be in the decode unit 14 while the next instruction (say I2) is being fetched from the instruction cache 14. Thus pipelining enables simultaneous operation of multiple instructions. In general, number of pipeline stages increases with the design complexity and the clock frequency. The term clock frequency refers to number of clock cycles within a time unit, usually a second.

Further, in typical prior art synchronous designs, a central clock 34 (shown in dashed lines) derived from external clock 30 through PLL 26 is distributed to all digital functional units (or blocks) of microprocessor 10. Data passes from one block to the other using one of the two clock edges provided by central internal clock 34. As the design complexity and the number of pipeline stages grow, the clock skew in the design become more pronounced.

Referring next to FIG. 2, the microprocessor 10 is shown with distributed clocks. Each unit has a distributed clock unit 40 associated with it. Local clocks (shown in FIG. 2 with postscript 'a' such as 12a) of each unit is synchronized with its neighbors. BIU 12 is synchronized with PLL 16 and external clock 30 through an internal clock 34a. It is also synchronized with instruction cache 14 and data cache 16 through local clock 12a. Instruction cache is synchronized with its neighbors, BIU 12 through local clock 12a and decode unit 18 through local clock 14a. Similarly, data cache 16 is synchronized with BIU 12 through local clock 12a and MDACU 24 via local clock 16a. Decode unit 18 is synchronized with instruction cache 14 via local clock 14a as well as register file 20, execution unit 22, and MDACU 24 through local clocks 18a. Register file 20 in turn is synchronized to decode unit 18 and execution unit 22. Execution unit 22 is synchronized with decode unit 18, register file 20 through local clock 18a, and MDACU 24 through local clock 24a while MDACU 24 is itself synchronized to data cache 16 through local clock 16a and execution unit 22 via local clock 24a.

FIG. 3 shows one embodiment of a distributed clock unit 40 located in one of the functional units, BIU 12, instruction cache 14, data cache 16, decode 18, register file 20, execution unit 22 or MDACU 24. In FIG. 3, a functional unit 41 is shown which represents any one of the functional units mentioned above. Registers 56 represent the pipeline registers or queue buffers used to isolate the block from other units. Block logic 54 represents the logic performing the function of functional unit 41. Input data 70 feeds registers 56, while block logic 54 generates output data 68.

In one embodiment, distributed clock unit 40 consists of a clock generation unit 50 and a clock control unit 52. Clock generation unit 50 generates local clocks 66 for internal use as well as for synchronization with its neighbors. Clock control unit 52 controls the operation of clock generation unit 50. Clock control unit 52 generates a disable 62 to disable generation of local clocks 66. Also, it selects one or more synchronization clocks 64 to provide synchronization reference to local clocks 66. In addition, clock control unit 52 generates control information such as a clock-period-selector 91 and a pulse-width-selector 88. Clock control unit 52 generates disable 62 based on the control information on control signals 58. It selects synchronization clocks 64 from input clocks 60 (from neighboring units) and local clocks 66. For instance, the input clocks 60 of the distributed clock unit 40 in BIU 12 are clock 34 from the PLL 26, local clock from instruction cache 14, and local clock from data cache 16. In one embodiment, local clocks 66 of BIU can be synchronized to PLL 26, instruction cache 14, data cache 16 or to its own local clocks 66.

Referring now to FIG. 4a, schematic diagram of one embodiment of a distributed, multi-pulse, clock generation unit 50 is shown. It comprises of a clock-generation-pair 80, pulse-width-pair 82a–82b, clock-period-pair 84a–84c, a pulse-width-selector 86, a clock-period-control 90, multi-pulse-taps 96a–96f, and a pulse-control-latch 92. Elements referred to herein with a particular reference number followed by a letter will be collectively referred to by the reference number alone. For example, multi-pulse-taps 96a–96f will be collectively referred to as multi-pulse-taps 96. Disable 62 and synchronization clocks 64 from clock control unit 52 (in FIG. 3) feed into clock-generation-pair 80 along with a pulse-hold 93. A pulse-reset 98 will deactivate pulse-hold 93. Local clock pulses 94a–94f represent pulses generated at different phases. These pulses can be conditionally enabled by enable signals such as a pulse-enable 95c. In one embodiment, pulse-enable 95c will be generated (not shown) by clock control unit 52.

In one embodiment, clock-generation-pair 80 comprise of a NAND gate followed by an inverter. Similarly in one embodiment, pulse-width-pair 82 comprises of a pair of inverter depicted by pulse-width-pair 82b or a NAND gate followed by an inverter depicted by pulse-width-pair 82a. In one embodiment, clock-period-pair 84 comprise of a pair of inverters. It should be noted that the various combinations of gates could be used in different embodiments of clock-generation-pair 80, pulse-width-pair 82, and clock-period-pair 84. Number of pulse-width-pair 82 and clock-period-pair 84 present in an embodiment dictates the pulse width and clock period parameters of the generated clocks.

To better understand the operation of clock generation unit 50 depicted in FIG. 4a, the negative clock pulses generated by clock generation unit 50 are depicted in the timing diagram FIG. 4b. Following explanation refer to both FIG. 4a and FIG. 4b. However for the sake of clarity, any reference to FIG. 4b will be explicitly stated. During initialization, disable 62 (depicted as active low in FIG. 4b) is asserted. This disables generation of local clock pulse signals 94. They remain high or inactive.

When clock control unit 52 (of FIG. 3) determines that a clock need to be generated by clock generation unit 50, it de-asserts disable 62 and enables a pulse on synchronization clocks 64. Negative edge transition of synchronization clocks 64 (shown as 100a in FIG. 4b) causes pulse-control-latch 92 to transition pulse-hold 93 to logic high level. When synchronization clocks 64 transitions to high level (shown as 100b in FIG. 4b) it causes all signals at the input of NAND gate of clock-generation-pair 80 (disable 64, synchronization clocks 64, and pulse-hold 93) to high level. This drives the output of NAND gate of clock-generation-pair 80 to a low level. This in turn forces the inverter of clock-generation-pair 80 to high level causing local clock pulse 94a to go low. This transition is shown in FIG. 4b as 94a-1. The transition travels through pulse-width-pair 82 and clock-period-pair 84 and is depicted in FIG. 4b for local clock pulse 94. Clock-generation-pair 80, pulse-width-pair 82, and clock-period-pair 84 together can be envisioned as a delay chain through which any transition on NAND gate of clock-generation-pair 80 will traverse. In one embodiment, local clock pulse 94f is selected as output clock 100 and its transitions are shown at 100c and 100d. It should be noted that output clock 100 along with local clock pulses 94 constitute local clocks 66 depicted in FIG. 3.

Depending on the value of pulse-width-selector 88 (1 in FIG. 4b), pulse-control-latch 92 will reset when the transition reaches 98. This causes pulse-hold 93 to go low and thus forcing NAND gate of clock-generation-pair 80 to go high. This results in second transition of levels following the first one depicted as 94a-2 in FIG. 4b. This transition is also transmitted across pulse-width-pair 82 and clock-period-pair 84 shown in FIG. 4b for local clock pulses 94. After the second transition, pulse-hold 93 will hold the circuit in this state until new synchronization clocks 64 restarts the process. This guarantees that only one pulse will be generated in a clock period. In one embodiment, conditional gate such as multi-pulse-tap 96c can be used instead of an inverting buffer such as multi-pulse-tap 96a. This enables some of the pulses to be conditionally generated by using a gating function such as pulse-enable 95c. When pulse-enable 95c is not active, there will be no pulse on local clock pulse 94c as shown by 94c-1 in FIG. 4b. This is one mechanism of introducing control information to clock signals.

The pulse width of local clocks varies depending on the value of pulse-width-selector 88. The value on pulse-width-selector 88 selects one of the signals signal 81a, signal 81b, or signal 81c through pulse-width-selector 86 as pulse-reset signal 98. In one embodiment, pulse-width-selector 88 can have value ranging from one to three, as the clock generation unit 50 comprises of one clock-generation-pair 80 and two pulse-width-pair 82. Maximum value of pulse-width-selector 88 depends on number of pulse-width-pair 82 present in any embodiment. In FIG. 4b, positive transition occurs at 94a-2 when pulse-width-selector 88 is one, at 94a-3 if pulse-width-selector 88 is two, and at 94a-4 if pulse-width-selector 88 is three. Similarly, the value of clock-period-selector 91 determines the clock period. In one embodiment, clock-period-selector 91 can vary from one to three based on three clock-period-pair 84 (of FIG. 4a). Maximum value of clock-period-selector 91 depends on number of clock-period-pair 84 (or number of pulse-width-pair 82 and clock-period-pair 84) in any given embodiment. The pulse edges of local clock pulses 94 depend on the delay through the dealt pairs. For instance, depending on the propagation delay across clock-generation-pair 80, the negative transition of pulse 94b can be at 94b-1 or 94b-2. Similarly the positive transition can be as 94b-3 or 94b-4.

Delay chain of clock-generation-pair 80, pulse-width-pair 82, and clock-period-pair 84 along with clock-period-control 90 determines the clock period of 100. Since clock-generation-pair 80, pulse-width-pair 82, and clock-period-pair 84 are all active elements in the design they are equally suseptable to any changes in the process technology as other active elements in the design. In one embodiment, gates in clock-generation-pair 80, pulse-width-pair 82, and clock-period-pair 84 can be chosen to closely reflect the gates in the logic path of the unit resulting in a scalable design with process technology.

Referring now to FIG. 4c, timing diagram of multiple clock cycles with varying clock periods are depicted. In one embodiment, during the first clock cycle, clock-period-selector 91 has a value of 3 resulting in local clock pulse 94f being selected as output clock 100 through clock-period-control 90. Clock period here is from 100a to 100c. During the next clock cycle, clock-period-selector 91 has a value of 1 thus selecting local clock pulse 94d through clock-period-control 90 as output clock 100. Clock period here is between 100c and 100e. Thus the clock period of the output clock can be varied dynamically.

It should be noted that in an embodiment, positive pulses (instead of negative pulses) can be generated from the same circuit such as clock generation unit 50 by tapping the pulses before the inverter of clock-generation-pair 80, pulse-width-pair 82, and clock-period-pair 84. In another embodiment both positive and negative pulses can be tapped. When positive or negative pulses are tapped, the granularity at which the clock period can be varied is two gates. When both positive and negative pulses are tapped this granularity is one gate. Also, in this case, the pulses with one gate delay phase difference can be generated.

In another embodiment, clock-generation-pair 80 can be followed by couple of buffers. The clock period in this case can be adjusted by varying the size of the transistors forming the buffers. Further embodiments can include some combinations of delay pairs (pulse-width-pair 82 and clock-period-pair 84) and buffers.

Referring next to FIG. 5, a block diagram one embodiment of clock control unit 52 (of FIG. 3) is depicted. It comprises of a control unit 110, a program control unit 112, a synchronization clock selector 114, and control counter 116. Input-clock 60a through 60n represent output clocks 100 from neighboring units that need to synchronize with the unit under consideration. In one embodiment, one or more of input clocks 60 can represent combination of plurality of local clocks from same or different functional units. The output clock 100 (depicted as part of local clocks 60 in FIG. 3) is also used as one of the input to synchronization clocks 64. While a control 58 controls the normal operation of distributed clock unit 40 (FIG. 3), initialization control 120 dictates its operation during initialization and synchronization.

In one embodiment during initialization (enabled by assertion of 120), control unit 110 activates disable 62 and enables program control unit 112 to program initial values for clock-period-selector 91 and pulse-width-selector 88 based on programmable control 118. Control unit 110 then deactivates disable 62 and selects one of input clock 60 as synchronization clocks 64. Program control unit 112 then adjusts clock-period-selector 91, if required, to synchronize with synchronization clocks 64. This fine-tuning may be needed to account for loading and routing delay that will be different for different local clocks. This fine-tuning of clock-period-selector 91 enable synchronization of local clocks 66 with neighboring clocks accounting for dynamic capacitive loading and routing delays. At the completion of initialization, distributed clock unit 40 enters normal operation mode.

In normal operation mode, disable 62 is de-activated when distributed clock unit 40 (FIG. 3) needs to generate clocks. Disable 62 is generated by control unit 110 based on control information on control signals 58. Thus here control signals 58 introduce control information to local clocks 66. Synchronization clock selector 114 selects synchronization clocks 64 based on the condition that is requiring the clock. For instance, if the functional unit associated with input clock 60a has sent data to functional unit 41 requiring action from functional unit 41, than input clock 60a is selected as synchronization clocks 64. Once functional unit 41 has started generating clocks, it can use either its own output clock 100 or any other input clock 60 in continuing to generate local clocks 66.

In one embodiment, input clock 60 can represent combination of multiple clocks. For instance, when multiple functional units are driving a functional unit simultaneously, it might be desirable to synchronize the local clocks of the unit with the input clock arriving last at clock-generation-pair 80. In this case, all input clocks will feed an AND gate (not shown) and the output of that AND gate will be one of the synchronization clocks. If synchronization with the first arriving clock is desired, an OR gate can be used instead of the AND gate mentioned above. It should be noted that in one embodiment, it is possible to generate multiple synchronization clocks 64 and use a wider gate at clock-generation-pair 80 to generate the necessary combination function.

In one embodiment, when synchronizing with combination of multiple input clocks or different clocks from different unit, it might be necessary to adjust the clock period of local clocks 66 accordingly. Program control unit 112, in this case can generate appropriate clock-period-selector 92 along with synchronization clocks 64. This feature can effectively account for varying propagation delay between various units.

It should be noted that during normal operation of control unit 110, control counter 116, program control unit 112, and other clock control functions are evaluated when input clock goes to logic low level. As the clock period is timed with the raising edge of the clock in this embodiment, all clock control function evaluation latency is transparent to clock generation logic. Clock generation does not incur any clock control function evaluation penalty as seen in traditional gated clock systems.

The generation of local clocks 66 can stop if there is a stall. Stall is a condition that blocks the flow of instructions through the pipe. For instance, if data cache 16 (of FIG. 2) does not have the requested data, it needs to fetch it from the main memory (which will take longer time). In this situation, data cache 16 informs requesting functional unit to wait until the data is available. This is a stall condition. If the MDASU 24 was requesting the data, then distributed clock unit 40 associated with MDASU 24 will stop generating local clocks 66. Generation of local clocks 66 in MDASU resumes with the arrival of input clock 60 from data cache 16. It should be noted that there are various types of stalls and the operation described above can be used for any such conditions.

In one embodiment, if the clock period of input clock 60 and that of output clock 100 are not equal, synchronization with such clock will happen in multiple of clock cycles instead of every cycle. For instance, if input clock 60*a* is selected and it is running at twice the clock period of output clock 100, then synchronization with input clock 60*a* happens once every two output clock 100. Every input clock 60 that runs at different clock period than output clock 100, has control counter 116 associated with it to assist in this type of synchronization. It is to be noted that with this mechanism, clocks of any period can be synchronized. For instance, if the output clock 100 is running at ⅔ clock period of input clock 60*a*, than synchronization happens for every 2 clock cycles input clock 60*a* and 3 clock cycles of output clock 100.

Clock period of output clock 100 can be varied to match the clock period of input clock 60. In this case, functional unit 41 will have varying clock period based the function it is required to perform. This is another example of embedding functionality into the clock control.

In one embodiment, each input clock 60 has control information associated with it that is part of control signals 58. This allows clock control unit 52 to generate local clocks 66 based on the functionality. This exemplifies another method of introducing control information to local clocks 66.

Above explained apparatus and methods enable a digital design to execute at highest frequency possible based on the design and technology. It might be desirable to run the design at much lower frequency due to system issues or power issues. FIG. 6 depicts a simple mechanism to achieve this. FIG. 6 depicts the clock period selection logic of FIG. 4*a*. It depicts local clock pulses 94*d* through 94*f* being selected by clock-period-control 90 based on the value on signal clock-period-selector 91. In addition, FIG. 6 depicts a frequency divider 85 inserted to the path of local clock pulse 94*f*. The count value of frequency divider 85 is programmable. Frequency divider 85 counts the number of pulses on 94*f* and generates a pulse on signal 94*g* when the number of pulses on 94*f* equals the programmed count value (say N). This results in output clock 100 having pulse ones every N pulses on 94*f*.

Synchronization of local clocks to external clocks is next explained with reference to FIG. 7. FIG. 7 depicts an external clock 140 coupled with a PLL 142. The figure also depicts six other functional units designated as functional unit 144, functional unit 148, functional unit 150, functional unit 152, functional unit 154, and functional unit 156. Each of these functional units has distributed clock unit associated with them that generate local clocks for the unit. In FIG. 7, functional unit 144 generates local clock 160, while functional unit 148 generates local clock 164, and functional unit 150 generates local clock 162. A frequency divider 146 feeds PLL 142 with a PLL synchronization clock 166. PLL 142 generates a PLL reference clock 168 based on external clock 140. Reference clock 168 feeds functional unit 144 with synchronization clock. In one embodiment of the design with no PLL, external clock is coupled directly as the synchronization clock to functional unit 144. This is shown as dashed line 140*a* in FIG. 7.

During initialization (such as reset), all the local clocks are disabled. Frequency divider 146 is first initialized to determine the internal clock frequency with respect to the external clock. There are several mechanisms in practice to do this. Software initialization with boot up program, initialization using mask-level-switch, and initialization based on specified input signals are some commonly used mechanisms to initialize frequency divider 146. Same mechanism can be extended to initialize each of the local clocks in the design. In one embodiment, each of clock-period-selector 91 in distributed clock unit 40 (FIG. 3) will have an initialization register. A simple boot up program can write values to this register based on frequency divider 146 and external clock 140. In one embodiment, programmable control unit 112 (FIG. 5) translates this value to initial clock-period-selector 91 value. In one embodiment, the value of clock-period-selector 91 in a functional unit is independent of the value of clock-period-selector 91 in other functional units.

After this coarse initial clock period set up, it may be required to synchronize the clocks to each other. This is to account for process variations, varying capacitive loading on local clocks, and other such reasons. The next step is to fine-tune the distributed clock synchronization. To achieve this, distributed clock unit 40 of different functional units are enabled gradually.

First, distributed clock unit 40 of functional unit 144 is enabled. This will synchronize with PLL reference clock 168. Programmable control unit 112 (FIG. 5) of said distributed clock unit 40 will select a value for clock-period-selector 91 (FIG. 5). This is achieved by comparing local clock pulses 94 (of FIG. 4*a*) with reference clock 168 shown in FIG. 7. In FIG. 5, local clock pulses 94 are shown as part of initialization control signals 120. Depending on the design requirement in an embodiment, synchronization reference clock can be tapped before synchronization clock control 114 (FIG. 5) and any other gates in the synchronization clock generation path.

In one embodiment, above mentioned fine-tuning will bring two clocks in synchronization within one or two gate delay of clock-period-pair 84 of FIG. 4*a*. If further tuning is needed, one or more of clock-period-pair 84 in FIG. 4*a* (say clock-period-pair 84*a*) can further be made programmable with inverter pairs of varying dimension. If PLL 142 (of FIG. 7) is present in the design, local clock 160 of functional unit 144 is feedback to PLL 142 as PLL feedback clock 166 through frequency divider 146.

Next step in the initialization process is to enable next level 170 of functional units functional unit 150 and functional unit 148. These are synchronized to local clock 160 from functional unit 144 using similar procedure described above. This is followed by synchronizing next level (say 172) of functional units. This process is repeated until all distributed clock units 40 in the design are programmed with synchronizing value for their respective clock-period-selector 91.

It should be noted that there are numerous possible variations to this initialization procedure. It is important to note that any given local clock can be synchronized to any other clock at a given time thus assuring synchronous operation in the design.

Referring next to FIG. 8, one embodiment of block diagram of a digital system with multiple external clocks is shown. Here, two external clocks 180a and 180b control two distinct portions of logic design blocks 192a and 192b respectively. External clock 180a synchronizes logic design block 192a while external clock 180b synchronizes logic design block 192b. The reference number alone will collectively refer to elements referred to herein with a particular reference number followed by a letter. External clock 180 interfaces with functional logic 184 through PLL 182. Functional logic 184 comprises of one or multiple functional units each with distributed clock units such as in FIG. 2.

In one embodiment, a distributed clock unit of functional unit 186a interfaces with distributed clock unit of functional unit 186b through buffers 188 and clocks 190. Local clock 190a of 186a can be used to synchronize local clock 190b of 186b. In one embodiment, 186 can run with varying clock period as depicted in FIG. 4c. In another embodiment, buffers 188 act as a pipe stage and are clocked by 190.

Referring now to FIG. 9, one embodiment of a computer system is depicted. It comprises of a microprocessor 200 coupled to a variety of components through a chipset 202 (via a CPU bus 220) and to a L2 cache 206 through L2 bus 228. In the depicted system, a main memory 210 is coupled to chipset 202 through a memory bus 226, and a graphics controller 204 is coupled to chipset 202 through an AGP bus 222. Several PCI devices 214a, 214b, 214c, and 214d forming the main I/O sub-system is coupled to chipset 202 through PCI bus 224. An ISA bridge 212 provides interfacing capability to any EISA/ISA devices.

Main memory 210 is a memory where all programs are stored and from which microprocessor 200 executes. Graphics controller 204 provides control for rendering of text and image on a display 208. Display 208 is any electronic display such as a cathode ray tube, a liquid crystal display, etc.

It is noted that, while AGP, PCI, EISA, and ISA buses are used as examples in the above description, any bus architectures may be substituted. Also, while a computer system with one microprocessor is depicted, it could have multiple microprocessors or any other components. While FIG. 9 denotes a sample system, the invention applies equally well to all other embodiments of the system.

This invention can be used advantageously in all of the components of the computer system. In one embodiment, multiple external clock mechanism such as the one depicted in FIG. 8 can be envisioned as a chip comprising of say microprocessor 200, chipset 202, and graphics controller 204. This is depicted in FIG. 9 as a multiple design unit 230. The synchronization described above with respect to FIG. 8 can be employed to couple the three units namely, microprocessor 200, chipset 202, and graphic controller 204.

It is to be noted that multiple design unit 230 above is one possible embodiment. The invention applies equally well to any combination of a digital system. Combining multiple designs in one chip has several advantages. With increasing internal frequency of operation, external communication is becoming a major bottleneck in terms of performance. A multiple design unit will reduce this communication to minimal level, thus increasing the overall system performance. This will also help in reducing the cost of the overall system. Such a design with distributed clocking mechanism described in this invention will have low power dissipation at high performance. Also, it will provide easy and efficient means to synchronize between several clocks.

In accordance with above disclosure, a digital design (say a simple microprocessor) has been shown to comprise of distributed clocking mechanism. The invention contemplates generation of local clocks for the distributed clocking mechanism and further contemplates varying clock period and pulse width of these local clocks. It enables generation of multiple clock pulses at different phases within the clock period. The invention further contemplates mechanisms to synchronize these local clocks to each other as well as to an external clock. The invention also contemplates synchronizing multiple external clocks.

While the above description contains many specificities, these should not be construed as limitations on the scope of the invention, but rather as an exemplification of preferred embodiments thereof. Accordingly, the scope of the invention should be determined not by the embodiment(s) illustrated, but by the appended claims and their legal equivalents.

What is claimed is:

1. A digital system that includes a plurality of coupled functional units, each having a self generated clock for controlling and synchronizing said functional units, that utilize an a output clock pulse having characteristics that are instantaneously selectable each output clock period, said digital system comprises:

at least one functional unit having a delay circuit, wherein said delay circuit is adapted to detect pulses on a reference clock, for delaying said pulses on said reference clock a first controllable quantum of time to generate a pulse on an output clock;

wherein said functional unit has a first circuit that is coupled to receive at least one data signal, for performing a selectable one of a plurality of different operations, wherein said first circuit is adapted to respond to a control signal for selecting, for each period of said output clock, one of said plurality of different operations; and wherein the magnitude of said first quantum of time is determined for each said output clock period based on the particular operation selected by said control signal.

2. The digital system of claim 1 wherein:

said delay circuit is adapted to provide a controllable duty cycle for said pulse on said output clock signal, wherein said duty cycle is determined for each output clock period based on the particular operation selected by said control signal.

3. The digital system of claim 1 wherein:

said functional unit includes a second circuit adapted to receive a first clock input, said output clock, and provide said reference clock signal;

wherein said second circuit selectively routes one of said first clock input and said output clock to said reference clock; and wherein on a first of said clock periods of said output clock said input signal is routed to said reference clock and on a second clock period, that is subsequent to said first clock period, said output clock is routed to said reference clock for an output clock frequency that varies from the frequency of said first clock input.

4. The digital system of claim 1 wherein:

said functional unit includes a second circuit adapted to receive a first and a second clock inputs, wherein said second circuit selectively routes one of said first and said second clock inputs to said reference clock; and wherein said second circuit selectively routes one of said first and second clock inputs to said reference clock; and wherein the input clock selected is determined for each output clock period based on the particular operation selected by said control signal.

5. The digital system of claim 1 wherein:

said delay circuit provides one or more intermediate clock signals having pulses that are delayed a second constant quantum of time from said reference clock pulses;

wherein magnitude of said second quantum of time is less than the magnitude of said fist quantum of time.

6. The digital system of claim 5 wherein:

said delay circuit is further comprised of a gate disposed between said reference clock signal and said intermediate clock signal;

wherein said gate is responsive to a control signal, wherein when said control signal is in a first state a pulse is generated on said intermediate gate for every pulse on said reference clock and when said control signal is in a second state said intermediate clock remains inactive.

7. A synchronous digital system that includes a plurality of coupled functional units comprising:

a first functional unit and a second functional unit, each said functional unit is coupled to selectively drive at least one output data signal, said output data signal is coupled to be received by a third functional unit as an input data signal;

wherein said first functional unit provides an output clock coupled to be received by said third functional unit as a first input clock;

wherein said second functional unit provides a second output clock coupled to be received by said third functional unit as a second input clock wherein said third functional unit is adapted to be responsive to a control signal that selects one of said first and second input clocks to be routed to a reference clock;

wherein said third functional unit provides on output clock having a selectable offset from said reference clock signal that is selected from of a plurality of options;

wherein when data is transferred between said first functional unit and said third functional unit, said first input clock is selected to be routed to said reference clock, and a first offset option is selected;

wherein when data is transferred between said second functional unit and said third functional unit, said second input clock is selected to be routed to said reference clock, and a second offset option is selected, wherein said first offset is different than said second offset.

8. The synchronous digital system of claim 7 wherein:

the frequency of said first input clock is different than the frequency of said second input clock.

9. The synchronous digital system of claim 7 further comprising:

a queue buffer disposed between said output data signals and said input data signals for storing data.

10. The synchronous digital system of claim 7 wherein:

when data is transferred between said first functional unit and said third functional unit, a first of said offset options is selected; and wherein when data is transferred between said second functional unit and said third functional unit, a second of said offset options is selected, wherein said first and second offsets are different.

11. The synchronous digital circuit of claim 7 wherein:

said third functional unit receives said output clock signal; and wherein in a first period of said output clock, one of said first and second input clocks are routed to said reference clock and in a second period of said output clock, output clock is routed to said reference clock to allow out put clock to have frequency that varies from said first and said second input clocks.

12. The synchronous digital system of claim 7 wherein:

said third functional unit provides an intermediate clock signal having a constant offset from said reference clock signal that is less than the selected offset for said output clock;

said delay circuit provides one or more intermediate clock signals having pulses that are delayed a second constant quantum of time from said reference clock pulses;

wherein magnitude of said second quantum of time is less than the magnitude of said fist quantum of time.

13. The synchronous digital system of claim 12 wherein:

said third functional unit is further comprised of a gate disposed between said reference clock signal and said intermediate clock signal;

wherein said gate is responsive to a control signal, wherein when said control signal is in a first state a pulse is generated on said intermediate gate for every pulse on said reference clock and when said control signal is in a second state said intermediate clock remains inactive.

14. A clock driver for synchronizing a functional unit to a coupled functional unit, that provides an output clock pulse that, when enabled, has characteristics that are instantaneously selectable each output clock period, each said clock driver comprises:

a delay circuit that is responsive to an enable signal, and is adapted to receive a reference clock and generate an output clock;

wherein for each active pulse detected on said reference clock, when said enable signal is active, an active pulse is generated on said output clock having an offset from the inactive edge of said reference clock pulse that is instantaneously selectable from a plurality of constant offset options;

wherein one of said selected offsets is selected while said reference clock is active; and wherein said offset remains constant when said reference clock is inactive.

15. The clock driver of claim 14 wherein:

the width of said active pulse on said output clock is instantaneously selectable from a plurality of constant width options;

wherein said pulse width remains constant when said reference clock is inactive.

16. The clock driver of claim 14 further comprising:

a control circuit that receives a first clock and a second clock and is responsive to a control signal; and wherein said control signal selects for each period of said output clock one of said first or said second clock signals to be routed to said reference clock signal.

17. The clock driver of claim 14 further comprising:

a counter circuit coupled to receive a first clock to provide said reference clock signal; and wherein said period of said reference clock is a multiple of the period of said first clock.

18. The clock driver of claim 14 further comprising:

a control circuit that receives a first clock and said output clock for selectively routing one of said first clock and said output clock to said reference clock signal; and wherein when said output clock is routed to said reference clock, the frequency of said output clock is different from the frequency of said first clock.

19. The clock driver of claim 14 further comprising:

an initialization circuit that is responsive to an initialization control signal, receives said reference clock and said output clock and determines said selected offset and said selected width options;

said initialization is adapted to detect the temporal variation between said reference clock and said output clock; and wherein when said initialization control signal transitions active, said initialization circuit detects said temporal variations and repeatedly selects one of said offset and width options, until said temporal variations are minimal.

20. The clock driver of claim 14 further comprising:

a control circuit that is adapted to detect pulses on a first clock and on a second clock; and wherein said control circuit provides said reference clock signal having an active pulse that corresponds to the last arriving pulse on said first and said second clock.

21. The clock driver of claim 14 further comprising:

a control circuit that is adapted to detect pulses on a first clock and on a second clock; and wherein said control circuit provides a reference clock signal having an active pulse that corresponds to the first arriving pulse on said first and said second clock.

22. A method for synchronizing a plurality of coupled functional units, that utilizes a plurality of clock drivers for synchronizing said functional units, wherein each said clock driver provides an output clock pulse wave that has characteristics that are instantaneously selectable each output clock period, said method comprises the steps:

providing at least one functional unit having a delay circuit, wherein said delay circuit is adapted to detect pulses on a reference clock, for delaying said pulses of said reference clock a first controllable quantum of time to generate a pulse on an output clock;

providing a first circuit that is coupled to receive at least one data signal, for performing a selectable one of a plurality of different operations, wherein said first circuit is adapted to respond to a control signal for selecting, for each period of said output clock, one of said plurality of different operations; and selecting for each output clock period, based on the particular operation selected by said control signal, the magnitude of said first quantum of time.

23. The method of claim 22 further comprising the steps of:

providing on said pulse on said output clock, a controllable duty cycle for said pulse;

determining for each output clock period, said duty cycle, based on the particular operation selected by said control signal.

24. A method for synchronizing a digital system that includes a plurality of coupled functional units, comprising the steps:

providing a first functional unit and a second functional unit, wherein each said functional unit is coupled to selectively drive at least one output data signal, and said output data signal is coupled to be received by a third functional unit as an input data signal;

generating a first output clock from said first functional unit that is coupled to be received by said third functional unit as a first input clock;

generating a second output clock from said second functional unit that is coupled to be received by said third functional unit as a second input clock;

driving a reference clock, wherein said third functional unit is adapted to be responsive to a control signal that selects one of said first and second input clocks to be routed to said reference clock;

providing on output clock signal having an active pulse for each pulse on said reference clock, that has an offset from said reference clock, that is selectable from a plurality of different offset options;

associating a different one of said offset options with each said first and second input clock;

detecting an active clock pulse on one of said first and second input clock signal;

selecting one of said first and second input clock signals that has said active pulse, to be routed to said reference clock;

selecting while said reference clock pulse is active, one of said offset options that is associated with said input clock that has said active pulse;

generating an output clock from said third functional unit.

25. A method for synchronizing coupled functional units, wherein each said functional unit provides an output clock pulse that, when enabled, has an offset from a reference clock and a pulse width that are instantaneously selectable each output clock period, said method comprised the steps of:

providing a delay circuit that is responsive to an enable signal, and is adapted to receive a reference clock and generate an output clock;

providing an output clock signal that has an active pulse for each said pulse detected on said reference clock pulse that has an offset from said reference clock that is dynamically selectable from a plurality of offset options, and wherein the width of said active pulse on said output clock is dynamically selectable from a plurality of width options;

generating an active pulse on said reference clock signal;

selecting, while said reference clock is active, one of said offset options and one of said pulse width options; and generating an active pulse of said output clock signal.

* * * * *